(12) United States Patent
Hirota et al.

(10) Patent No.: US 6,966,188 B2
(45) Date of Patent: Nov. 22, 2005

(54) PLATE-LIKE BODY CONNECTING METHOD, CONNECTED BODY, TAIL PIPE FOR GAS TURBINE COMBUSTOR, AND GAS TURBINE COMBUSTOR

(75) Inventors: Norihide Hirota, Hyogo (JP); Kazuyuki Kimura, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 183 days.

(21) Appl. No.: 10/398,201

(22) PCT Filed: Aug. 1, 2002

(86) PCT No.: PCT/JP02/07872

§ 371 (c)(1),
(2), (4) Date: Apr. 7, 2003

(87) PCT Pub. No.: WO03/016695

PCT Pub. Date: Feb. 27, 2003

(65) Prior Publication Data

US 2004/0020212 A1 Feb. 5, 2004

(30) Foreign Application Priority Data

Aug. 9, 2001 (JP) ........................................ 2001-242678

(51) Int. Cl.[7] .............................................. F02K 1/00
(52) U.S. Cl. ........................ 60/770; 29/402.09; 29/445; 228/165
(58) Field of Search ............... 60/770, 752; 239/265.11; 29/402.09, 402.16, 423, 530, 557, 558, 402.11–402.14, 445; 228/165–172, 174

(56) References Cited

U.S. PATENT DOCUMENTS

| | | | | |
|---|---|---|---|---|
| 3,584,972 A | * | 6/1971 | Bratkovich et al. ...... | 416/229 R |
| 4,004,343 A | * | 1/1977 | Marsden ...................... | 29/596 |
| 4,132,343 A | * | 1/1979 | Kullendorff .................. | 228/168 |
| 4,163,869 A | * | 8/1979 | Almand et al. ........... | 174/94 R |
| 4,296,606 A | * | 10/1981 | Reider .......................... | 60/754 |
| 4,354,301 A | * | 10/1982 | Takeuchi et al. ......... | 29/896.41 |
| 4,354,304 A | * | 10/1982 | Dixon ........................ | 29/527.1 |
| 4,359,599 A | * | 11/1982 | Benner ..................... | 174/94 R |
| 5,129,223 A | * | 7/1992 | Doellner ...................... | 60/802 |

(Continued)

FOREIGN PATENT DOCUMENTS

| | | |
|---|---|---|
| EP | 1001221 | 5/2000 |
| JP | 2-12675 | 3/1990 |
| JP | 7-27335 | 1/1995 |
| JP | 10-15743 | 1/1998 |
| JP | 10-227230 | 8/1998 |
| WO | 97/14875 | 4/1997 |

*Primary Examiner*—Cheryl Tyler
*Assistant Examiner*—William H. Rodriguez
(74) *Attorney, Agent, or Firm*—Oblon, Spivak, McClelland, Maier & Neustadt, P.C.

(57) ABSTRACT

The present invention provides a plate-like body connecting method in which functions such that cooling capability is not reduced. There is provided a plate-like body connecting method for connecting at least two plate-like bodies each having passages that extend along at least one of opposite surfaces thereof and between the opposite surfaces, comprising the steps of disposing the plate-like bodies so that edges of the plate-like bodies are abutted with each other; connecting the plate-like bodies along the edges; forming a groove in the one surfaces of the plate-like bodies along the edges; and attaching a closure to and along the groove. Preferably, a distance between the other surfaces of the plate-like bodies and the bottom of the groove is substantially identical to a distance between the other surfaces and the passages, and a distance between the one surfaces of the plate-like bodies and the front end of the projection of the closure is substantially identical to a distance between the one surface and the passages.

10 Claims, 3 Drawing Sheets

U.S. PATENT DOCUMENTS

| | | | | |
|---|---|---|---|---|
| 5,273,204 A | * | 12/1993 | Dalal et al. | 228/166 |
| 5,545,003 A | * | 8/1996 | O'Connor et al. | 415/115 |
| 5,647,202 A | * | 7/1997 | Althaus | 60/266 |
| 6,164,075 A | * | 12/2000 | Igarashi et al. | 60/752 |
| 6,173,561 B1 | | 1/2001 | Sato et al. | |
| 6,253,989 B1 | * | 7/2001 | Bennett | 228/135 |
| 6,282,905 B1 | * | 9/2001 | Sato et al. | 60/752 |
| 6,631,838 B2 | * | 10/2003 | Kim et al. | 228/225 |
| 6,681,820 B2 | * | 1/2004 | Olofsson | 144/368 |
| 6,725,522 B1 | * | 4/2004 | Ivanov et al. | 29/525 |
| 6,749,002 B2 | * | 6/2004 | Grinberg et al. | 164/46 |
| 6,761,031 B2 | * | 7/2004 | Bunker | 60/752 |
| 6,774,339 B1 | * | 8/2004 | Smathers et al. | 219/121.66 |
| 2003/0196305 A1 | * | 10/2003 | Kebbede et al. | 29/402.11 |
| 2004/0056070 A1 | * | 3/2004 | Ivanov | 228/174 |
| 2004/0060295 A1 | * | 4/2004 | Mandai et al. | 60/725 |

* cited by examiner

(a)

(b)

PLATE-LIKE BODY CONNECTING METHOD, CONNECTED BODY, TAIL PIPE FOR GAS TURBINE COMBUSTOR, AND GAS TURBINE COMBUSTOR

TECHNICAL FIELD OF THE INVENTION

The present invention relates to a plate-like body connecting method for connecting at least two plate-like bodies each having passages that extend along at least one of the opposite surfaces thereof and between the opposite surfaces, a connected body connected by the plate-like body connecting method, a tail pipe for a gas turbine combustor, and a gas turbine combustor having the tail pipe.

PRIOR ART

As a component of a gas turbine combustor, a jet engine, a space-related device or the like, a plate-like body having stripe-like passages between the opposite surfaces thereof, has been used. The gas turbine combustor or the like can be cooled by passing a working fluid such as air or steam through the inside passages.

As shown in FIG. 2, that is a sectional view of the gas turbine combustor, a gas turbine combustor 20 is composed of a fuel supplying portion 21 and a tail pipe 22 that introduces combustion gas having high temperature and high pressure to a turbine (not shown). The fuel supplying portion 21 is composed of a cone 23 in which pilot fuel X and air are supplied to form a diffusion flame, and nozzles 24 for injecting a pre-mixed gas of main fuel Y and air. The fuel supplying portion 21 is of a so-called multi-nozzle type in which a plurality of nozzles 24 are spaced substantially at equal distances around the cone 23.

The tail pipe 22 is composed of at least two plate-like bodies 25. As shown in FIG. 3, that is an enlarged sectional view of such plate-like body 25, a wall 26, on one side, having stripe-like grooves is laminated on a planar wall 27, on the other side, by welding or the like, to form the plate-like body 25. As can be seen from FIG. 3, stripe-like passages 28 which extend substantially in parallel with the surface of the plate-like body 25 are formed inside the plate-like body 25. Therefore, a working fluid Z such as air or steam can be passed through the passages 28 of the plate-like bodies which constitute the tail pipe 22, so that the tail pipe 22 can be cooled.

In order to efficiently supply combustion gas to the turbine, the tail pipe 22 is in the form of a pipe whose sectional shape is defined by a three-dimensionally curved shape with the cross section area being gradually decreased in its axial direction. FIGS. 4(a) and 4(b) show a general connecting method for connecting at least two plate-like bodies. As shown in FIGS. 4(a) and 4(b), in a prior art, a plurality of plate-like bodies 25a, 25b cut into an appropriate shape are disposed so that edges of the plate-like bodies are abutted with each other. At least one of the edges is beveled for welding and, then, the edges are connected by welding, for example, TIG welding. Thus, the tail pipe 22 is formed.

However, because the plate-like bodies 25 that constitute the tail pipe 22 is cut into a predetermined shape as described above, there is a possibility that a passage 28a may open at the edge to be connected, in the plate-like body 25a shown in FIG. 4(a). If the plate-like body 25a having, at its edge, an opening of the passage 28a, is connected by a known connecting method, the passage 28a is closed by a welding metal 29. Accordingly, the cooling capability, at an area where the closed passage 28 exists, is reduced.

Furthermore, the plural passages 28 that are in parallel with each other are normally formed in the plate-like body. Therefore, even if the passages 28 are not closed at the connected portion, a distance between the adjacent passages 28, i.e., the pitch of the passages including the connected portion is locally increased. Consequently, the cooling capability at the connected portion is reduced more than at the other portion.

Drawbacks in the above connecting method are also applied to devices other than the tail pipe 22 of the gas turbine combustor 20. In other words, the drawbacks are applied to all plate-like bodies having therein passages through which a working fluid passes.

In view of the drawbacks, the object of the present invention is to provide a plate-like body connecting method for connecting at least two plate-like bodies each having passages that extend along at least one of opposite surfaces thereof and between the opposite surfaces, a connected body connected by the plate-like body connecting method, a tail pipe for a gas turbine combustor, and a gas turbine combustor having the tail pipe.

According to a first embodiment, there is provided a plate-like body connecting method for connecting at least two plate-like bodies each having passages that extend along at least one of opposite surfaces thereof and between the opposite surfaces, comprising the steps of disposing the plate-like bodies so that edges of the plate-like bodies are abutted with each other; connecting the plate-like bodies along the edges; forming a groove in one surface of the plate-like bodies along the edges; and attaching a closure to and along the groove.

In the first embodiment, a linear hollow portion is defined by the groove and the closure at the connected portion. If the passage opens at the to-be-connected edge, the passage is communicated to the hollow portion. Therefore, the hollow portion is used as a passage for the working fluid, so that the passage which opens in the edge of the plate-like body can be prevent from being closed, and the pitch between the passages can be prevented from increasing at the connected portion.

Therefore, the connected body connected by the above connecting method prevents capabilities, such as the cooling capability obtained by passing the working fluid such as air through the inside passage, from being reduced at the connected portion. Especially, when the tail pipe of the gas turbine combustor is formed by the above plate-like body connecting method, the cooling capability at the connected portion is substantially identical to that at the other portion. Consequently, the occurrence of cracks or the like can be reduced, and the life of the tail pipe can be increased. Therefore, easy maintenance and labor savings can be obtained by the gas turbine combustor provided with such tail pipe.

According to a second embodiment, there is provided a plate-like body connecting method, wherein a distance between the other surfaces of the plate-like bodies and the bottom of the groove is substantially identical to a distance between the other surfaces and the passages.

In the second embodiment, the bottom of the passage of the plate-like body can be made substantially identical, in height, to the bottom of the hollow portion formed in the connected portion. Consequently, (1) sufficient strength of the connected portion, (2) sufficient and uniform functions such as cooling capability in the connected portion, and (3) establishment of a streamline flow in the working fluid passing through the passages and the hollow portion, can be ensured.

According to a third embodiment, there is provided a plate-like body connecting method, further comprising the step of smoothing the other surfaces of the plate-like bodies after connecting the plate-like bodies.

In the third embodiment, the other surfaces of the plate-like bodies are in substantially same plane. Therefore, in the connected body (for example, the tail pipe of the gas turbine combustor) composed of such plate-like bodies, the occurrence of detrimental effects on the functions (for example, the circulation of combustion gas) of the product can be prevented.

According to a fourth embodiment, there is provided a plate-like body connecting method, further comprising the step of beveling the edges of the plate-like bodies before connecting the plate-like bodies.

In the fourth embodiment, when the edges of the plate-like bodies are connected by welding, the welding operation can be easily carried out, and the accuracy and the strength in welding can be increased. The beveled edge can be made of any type including an I-type, a V-type, and a single-edged type.

According to a fifth embodiment, there is provided a plate-like body connecting method, wherein the closure has a projection projecting toward the bottom of the groove.

In the fifth embodiment, the strength of the connected portion can be increased. The flow rate of the working fluid passing through the passage of the plate-like body can be adjusted by adjusting the height of the projection of the closure.

According to a sixth embodiment, there is provided a plate-like body connecting method, wherein the distance between one surface of the plate-like bodies and the front end of the projection of the closure is substantially identical to a distance between the one surface and the passages.

In the sixth embodiment, the upper surface of the hollow portion and the upper portions of the passages of the plate-like body can be positioned on substantially the same line with respect to the surface of the plate-like body, the flow rate of the working fluid passing through the hollow portion and the passages can be made uniform, and a streamline flow in the working fluid in the communicated portion can be promoted.

According to a seventh embodiment, there is provided a plate-like body connecting method, wherein the closure is made of the same material as that of the plate-like bodies.

In the seventh embodiment, the closure is made of the same material as that of the plate-like body, so that expansion coefficients of the plate-like body and the closure can be matched with each other. Consequently, the detachment, breakage, or the like, of the closure can be prevented in a heat cycle.

EMBODIMENTS

Embodiments of the present invention will be described below in detail with reference to the drawings. FIGS. 1(a) to 1(e) are explanatory views showing each step of a connecting method according to an embodiment of the present invention, and are sectional views of plate-like bodies each having passages between the opposite surfaces thereof.

Figure 1:
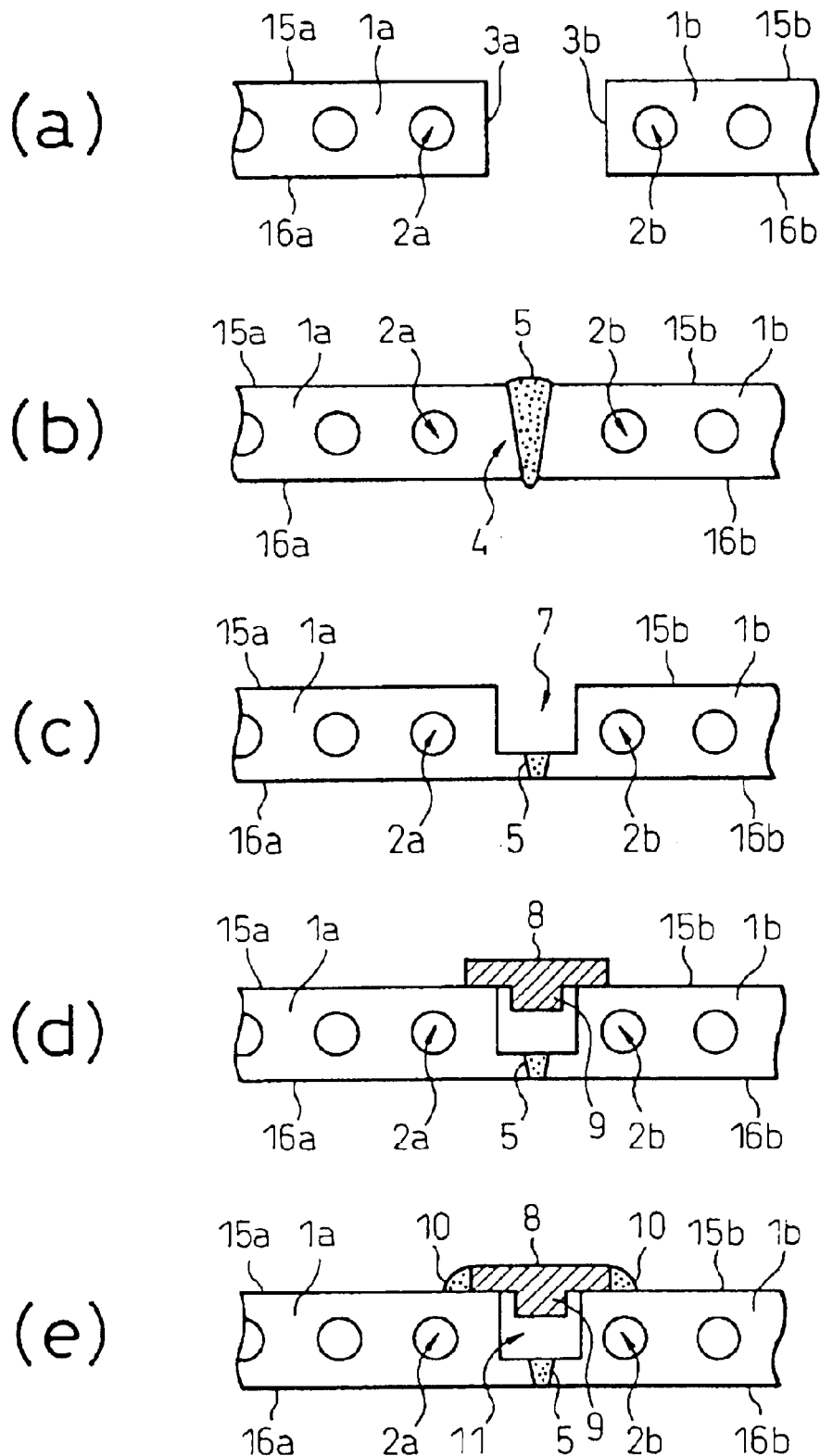
FIGS. 1(a) to 1(e) are sectional views of plate-like bodies for explaining a connecting method according to an embodiment of the present invention.
Figure 2:
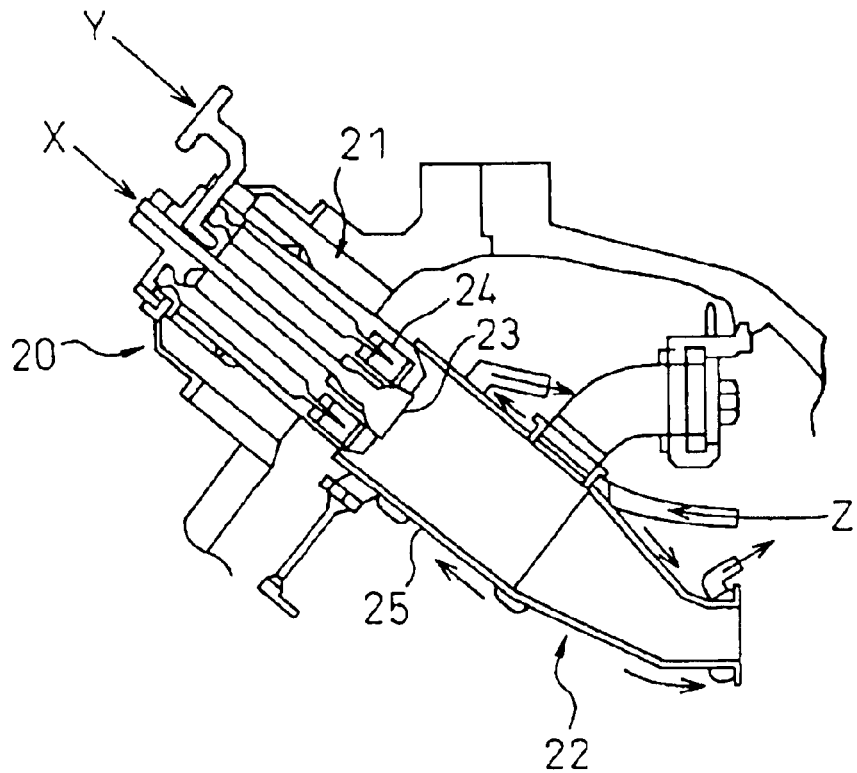
FIG. 2 is a sectional view of a general gas turbine combustor.
Figure 3:
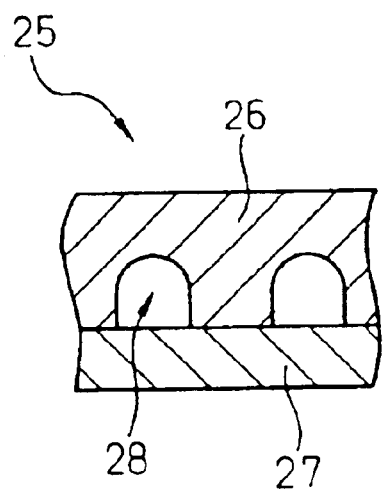
FIG. 3 is a partially sectional view of plate-like bodies which constitute a tail pipe of a gas turbine combustor.
Figure 4:
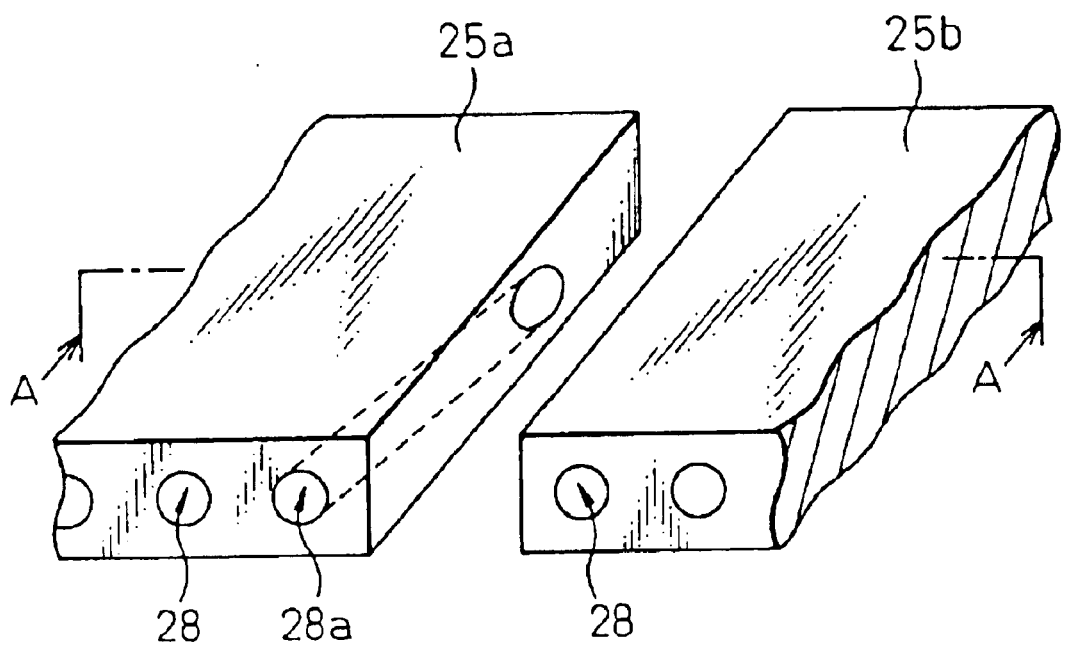
FIG. 4(a) is a schematic view showing a pair of plate-like bodies before being connected.
FIG. 4(b) is a sectional view (taken along the line A—A in FIG. 4(a)) of plate-like bodies which have been connected by a known connecting method.
Figure 4:
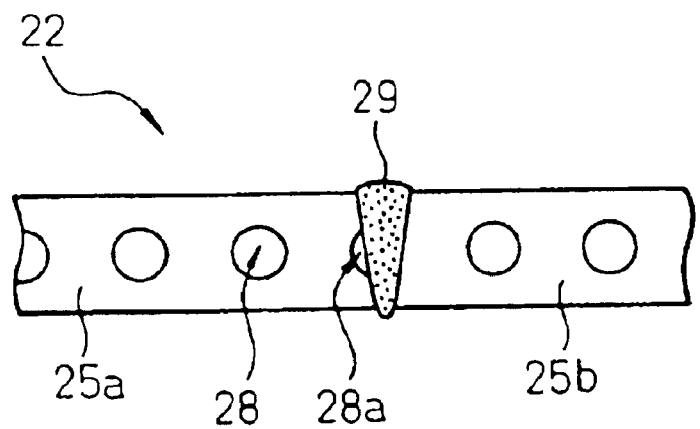

In the plate-like body connecting method for connecting the plate-like bodies shown in FIG. 1, edges 3a, 3b (preferably, in parallel with passages 2a, 2b) of a pair of plate-like bodies 1a, 1b having therein stripe-like passages 2a, 2b, are connected, as shown in FIG. 1(a). The passages 2a, 2b extend along at least one of the opposite surfaces of the plate-like bodies 1a, 1b and between the opposite surfaces of the plate-like bodies 1a, 1b. The plate-like bodies have upper surfaces 15a, 15b and lower surfaces 16a, 16b, respectively. The plate-like bodies 1a, 1b are disposed so that the edges 3a, 3b of the plate-like bodies 1a, 1b are abutted with each other.

As shown in FIG. 1(b), a beveled portion 4 is formed by cutting the edges 3a, 3b of a pair of the abutted plate-like bodies 1a, 1b by means of a cutting tool such as a grinder. The beveled portion 4 may be made of any types including I-type, V-type, single-edged type, etc.

A pair of plate-like bodies 1a, 1b are connected along the edges 3a, 3b. As shown in FIG. 1(b), in this connecting step, it is preferable that the plate-like bodies 1a, 1b are connected by charging a welding metal 5 into the beveled portion 4 so as to weld them together. As a result of welding, the connected body which can resist relatively high temperatures can be formed. As the connecting method used in the connecting step, welding operations including a TIG welding, a MIG welding, a plasma welding, a $CO_2$ arc welding and a MAG welding, and other connecting operations can be adopted, but it is not limited thereto.

After connecting the plate-like bodies 1a, 1b, as shown in FIG. 1(c), a groove 7 is formed by removing a part of plate-like bodies from the upper surfaces 15a, 15b, along the edges 3a, 3b. When the removing operation is carried out, the welding metal 5 (other than the bottom portion thereof) is partially removed. The groove 7 has a width which can cover the beveled portion 4. It is preferable that a distance between the lower surfaces 16a, 16b of the plate-like bodies 1a, 1b and the bottom of the groove 7 is substantially identical to that between the lower surfaces 16a, 16b and the passages 2a, 2b. Accordingly, when the connected body composed of the connected plate-like bodies is used, the strength of the connected portion is prevented from being partially decreased, functions according to the passages, including a cooling function, can be ensured even in the connected portion and can be made uniform, and the working fluid passing through the passages and the hollow portion can have a streamline flow. As means for forming the groove 7, a general cutting/grinding means such as a grinder is adopted, but it is not limited thereto.

In the present embodiment, the groove 7 having a rectangular section is shown. However, a groove having a circular base may be formed. In this case, a reduction in the strength of the connected body can be prevented because the shape of the hollow portion defined by the groove can be made substantially identical to that of the passage.

As shown in FIG. 1(b), when the plate-like bodies 1a, 1b are connected by welding, a part of the welding metal 5 charged into the beveled portion 4 is projected from the lower surfaces 16a, 16b of the plate-like bodies 1a, 1b. Therefore, as shown in FIG. 1(c), it is preferable that the lower surfaces 16a, 16b of the plate-like bodies 1a, 1b are made flush with each other by removing the projected portion. Accordingly, when the connected body composed of the connected plate-like bodies 1a, 1b is used for the tail pipe of the gas turbine combustor, combustion gas passing through the tail pipe can more smoothly pass through the tail pipe. Similar to the above groove-forming step, as means for removing the projected portion of the welding metal 5, a general cutting/grinding means such as a grinder is adopted. Regardless of the order of the bottom surface-smoothing step and the groove-forming step, both steps can be carried out at the same time.

Next, the closure 8 is attached to the groove 7. As shown in FIG. 1(d), the closure 8 has a size large enough to cover the opening of the groove 7. In the present embodiment, end portions of the closure 8 are disposed on the upper surfaces 15a, 15b of the plate-like bodies 1a, 1b so as to cover the opening of the closure 8. Then, as shown in FIG. 1(e), the end portions of the closure 8 are connected to the upper surfaces 15a, 15b of the plate-like bodies 1a, 1b. As the connecting method used in the connecting step, welding operations including a TIG welding, a MIG welding, a plasma welding, a $CO_2$ arc welding and a MAG welding, and other connecting operations can be adopted, but it is not limited thereto.

A projection 9 is provided on the under face, i.e., the surface facing toward the groove 7, of the closure 8. The projection 9 is inserted into the opening of the groove 7 to attach the closure 8 to the groove 7, and thus the hollow portion 11 is formed. After the attachment of the closure 8, a distance between the upper surfaces 15a, 15b of the plate-like bodies 1a, 1b and the front end of the projection 9 of the closure 8 is made substantially identical to a distance between the upper surfaces 15a, 15b of the plate-like bodies 1a, 1b and the passages 2a, 2b. Therefore, the front end of the projection 9 of the closure 8 and the upper portions of the passages 2a, 2b are positioned on the substantially same reference plane that is substantially parallel with the plate-like bodies 1a, 1b. Thus, the flow rate of the working fluid passing through the hollow portion 11 and the passages 2a, 2b can be made uniform, and the streamline flow of the working fluid in the communicating portion can be promoted.

In the present embodiment, a closure having a size larger than the width of the groove 7 is adopted. However, the closure having a size similar to the width of the groove 7 may be fitted and attached to the groove 7. In this case, the upper surface and the lower surface of the connected body formed by connecting the plate-like bodies can be made smooth. Also, it is not necessary to provide the projection 9 in the case of fitting the closure to the groove 7, and it is preferable that a distance between the upper surfaces 15a, 15b of the plate-like bodies and the lower surface of the closure is made substantially identical to a distance between the upper surfaces 15a, 15b and the passages 2a, 2b. As a matter of course, the edge of the closure is connected to the wall of the groove 7 by, for example, the above-described welding or the like, even in the case of fitting the closure to the groove 7.

A material of the closure 8 is not limited and, for example, a stainless steel, a heat-resistant steel or the like can be adopted if the material has the strength, the heat resistance and the like required for the connected body of the tail pipe for the gas turbine combustor. Preferably, the material of the closure 8 is the same as that of the plate-like bodies 1a, 1b. Thus, the possibility of detachment, breakage or the like of the closure, after a heat cycle, due to a difference between expansion coefficients of the plate-like body and the closure, can be reduced.

As described above, the hollow portion 11 is formed between the bottom of the groove 7 and the front end of the projection 9 of the closure 8. As a result, the hollow portion 11 becomes a passage that is in parallel with the passages 2a, 2b. Therefore, the pitch between the passages can be prevented from being narrowed at the connected portion. The passages 2a, 2b can be prevented from being closed at the connected portion because the passages 2a, 2b are communicated to the hollow portion 11 when the passages 2a, 2b open at the edges 3a, 3b.

In the connected body composed of the plate-like bodies 1a, 1b connected by the above connecting method, for example, the tail pipe for the gas turbine combustor, the working fluid such as air, steam or the like can be passed through the hollow portion 11 in addition to the passages 2a, 2b. Therefore, a reduction of the cooling capability due to the narrowing of the pitch between the passages 2a, 2b and the closing of the passages 2a, 2b does not occur. The uniformity of the cooling capability at the connected portion and the other portion can be promoted because the hollow portion 11 and the passages 2a, 2b are linearly connected when the plate-like bodies 1a, 1b are viewed from the side face thereof. Also, a streamline flow of the working fluid in the communicated portion can be promoted when the passages 2a, 2b are communicated to the hollow portion 11. Therefore, the connected body composed of the plate-like bodies connected by the above connecting method, for example, the tail pipe for the gas turbine combustor, can prevent the reduction of capabilities, such as a cooling capability, in the connected portion. Thus, easy maintenance and labor savings can be obtained by the gas turbine combustor provided with the tail pipe.

The plate-like body connecting method, according to the present invention, for connecting at least two plate-like bodies each having passages that extend along at least one of the opposite surfaces thereof and between the opposite surfaces, is not limited to the above-described embodiments. For example, the step of beveling and the step of smoothing the bottom can be omitted. It is not necessarily required to provide the projection 9 on the closure 8. Even in the case that the projection 9 is not provided with the closure 8, the closing of the passages 2a, 2b and the increase of the pitch between the passages 2a, 2b can be prevented. The height of the projection 9 is not necessarily required to be made substantially identical to a distance between the upper surfaces 15a, 15b of the plate-like bodies 1a, 1b and the passages 2a, 2b, and can be varied. The flow rate of the working fluid passing through the passages 2a, 2b can be adjusted by adjusting the height of the projection 9 as described above. The front end of the projection 9 may be recessed. In this case, sufficient and uniform functions, such as a cooling capability, can be ensured in the connected portion because the cross sectional shape of the hollow portion 11 is made substantially identical to that of the passages.

According to the first embodiment, there can be obtained the common effect in which the passages inside the plate-like body can be prevented from being closed in the connected portion and the pitch between the passages can be prevented from increasing in the connected portion.

According to the second embodiment, can be obtained the effect in which the strength of the connected portion can be ensured.

According to the third embodiment, can be obtained the effect in which the combustion gas can smoothly pass when the present invention is applied to the tail pipe of the gas turbine combustor.

According to the fourth embodiment, can be obtained the effect in which the welding operation can be easily carried out, and the accuracy and the strength in welding can be increased.

According to the fifth embodiment, can be obtained the effect in which the strength of the connected portion can be increased, and the flow rate of the working fluid passing through the passages of the plate-like bodies can be adjusted by adjusting the height of the projection of the closure.

According to the sixth embodiment, can be obtained the effect in which the uniformity of the flow rate of the working fluid passing through the hollow portion and the passages, and a streamline flow of the working fluid in the communicated portion, can be promoted.

According to the seventh embodiment, can be obtained the effect in which the detachment of the closure after a heat cycle can be prevented by matching the expansion coefficients with each other.

What is claimed is:

1. A plate-like body connecting method for connecting at least two plate-like bodies having opposite surfaces and having edges, each of the plate-like bodies having passages that extend along and between at least one of the opposite surfaces thereof, comprising the steps of:

disposing the plate-like bodies so that the edges of the plate-like bodies are abutted with each other;

connecting the plate-like bodies along the edges;

forming a groove in the one surfaces of the plate-like bodies along the edges; and attaching a closure to and along the groove.

2. A plate-like body connecting method according to claim 1, wherein a distance between a bottom one of the opposite surfaces of the plate-like bodies and the bottom of the groove is substantially identical to a distance between the bottom surface and the passages.

3. A plate-like body connecting method according to claim 1 or 2, further comprising the step of smoothing at least one of the opposite surfaces of the plate-like bodies after connecting the plate-like bodies.

4. A plate-like body connecting method according to any one of claim 1 or 2, further comprising the step of beveling the edges of the plate-like bodies before connecting the plate-like bodies.

5. A plate-like body connecting method according to any one of claim 1 or 2, wherein the closure has a projection projecting toward the bottom of the groove.

6. A plate-like body connecting method according to claim 5, wherein a distance between the top ones of the opposite surfaces of the plate-like bodies and the front end of the projection of the closure is substantially identical to a distance between the top surface and the passages.

7. A plate-like body connecting method according to any one of claim 1 or 2, wherein the closure is made of the same material as that of the plate-like bodies.

8. A connected body formed by connecting at least two plate-like bodies having opposite surfaces and having edges connecting the opposite surfaces, each of the plate-like bodies having passages that extend along and substantially parallel to at least one of the opposite surfaces thereof, a closure and a groove covering the closure, wherein said connected body is formed by the steps of disposing the plate-like bodies so that the edges of the plate-like bodies are abutted with each other; connecting the plate-like bodies along the edges; forming a groove in the one surfaces of the plate-like bodies alone the edges; and attaching a closure to and along the groove.

9. A tail pipe for a gas turbine formed by connecting at least two plate-like bodies having opposite surfaces and having edges connecting the opposite surfaces, each of the plate-like bodies having passages that extend along and substantially parallel to at least one of the opposite surfaces thereof, a closure and a groove covering the closure, wherein said connected body is formed by the steps of disposing the plate-like bodies so that the edges of the plate-like bodies are abutted with each other; connecting the plate-like bodies along the edges; forming a groove in the one surfaces of the plate-like bodies along the edges; and attaching a closure to and along the groove.

10. A gas turbine combustor comprising a tail pipe claimed in claim 9.

* * * * *